United States Patent
Hariya et al.

(10) Patent No.: US 8,089,478 B2
(45) Date of Patent: Jan. 3, 2012

(54) MODEL SIMPLIFICATION APPARATUS AND PROGRAM

(75) Inventors: Masayuki Hariya, Kasumigaura (JP); Ichiro Kataoka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1117 days.

(21) Appl. No.: 11/836,190

(22) Filed: Aug. 9, 2007

(65) Prior Publication Data

US 2008/0036765 A1 Feb. 14, 2008

(30) Foreign Application Priority Data

Aug. 9, 2006 (JP) ................................. 2006-216366

(51) Int. Cl.
G06T 15/00 (2011.01)
G06T 17/00 (2006.01)
(52) U.S. Cl. ........................................ 345/419; 345/420
(58) Field of Classification Search .................. 345/419, 345/420
See application file for complete search history.

(56) References Cited

U.S. PATENT DOCUMENTS

| 7,079,990 | B2 * | 7/2006 | Haller et al. ....................... 703/2 |
| 2002/0167518 | A1 * | 11/2002 | Migdal et al. ................. 345/428 |
| 2003/0090526 | A1 * | 5/2003 | Nishigaki et al. ............. 345/810 |
| 2004/0213915 | A1 * | 10/2004 | Andersen .................... 427/421.1 |
| 2005/0002571 | A1 * | 1/2005 | Hiraga et al. ................. 382/218 |
| 2007/0279414 | A1 * | 12/2007 | Vandenbrande et al. ..... 345/420 |

FOREIGN PATENT DOCUMENTS

| JP | 2000-331194 | 11/2000 |
| JP | 2000331194 A | * 11/2000 |
| JP | 2001-117907 | 4/2001 |

OTHER PUBLICATIONS

Date et al., A Study of Multiresolution Mesh Modeling for Finite Element Analysis-Adaptive Detail Feature Removal and Recovering-by Collective Treatise used in Autumn Academic Lecture of 2005 of the Japan Society for Precision Engineering, Sep. 1, 2005, p. 191-192 and its translation.

Soda et al., Retrieval Method for 3D Object Models based on Scale, Shift and Rotation-Invariant Graphical Feature in the Institute of Electronics, Information and Communication Engineers (IEICE) Technical Report, Sep. 2, 2003, vol. 103, No. 296, p. 85-90 and its translation.

* cited by examiner

*Primary Examiner* — Ulka Chauhan
*Assistant Examiner* — Jeffrey Chow
(74) *Attorney, Agent, or Firm* — Antonelli, Terry, Stout & Kraus, LLP.

(57) ABSTRACT

A model simplification apparatus performs: inputting a 3D geometric model; forming a surface mesh on the input geometric model and registering the surface mesh as an initial mesh; classifying the surface mesh into partial surface meshes, and calculating feature quantities of the partial surface meshes; inputting each group of mesh elements of the geometry features as reference feature shapes; searching for groups of mesh elements of similar geometry features to the reference feature shapes. Furthermore, removing group of mesh elements corresponding to the similar feature shapes from the initial mesh, and forming simplified mesh parts instead of removed similar feature shapes.

3 Claims, 8 Drawing Sheets

FIG. 1

FIG. 2A
SHAPE MODEL

FIG. 2B
SURFACE MESH

FIG. 3A
ELEMENT DATA

| NUMBER OF ELEMENTS | 7212 | |
|---|---|---|
| ELEMENT NUMBER | NUMBER OF NODES | NODE NUMBERS CONSTITUTING THE ELEMENT |
| 1 | 8 | 1, 2, 3, 4, |
| 2 | 8 | 2, 9, 10, 3, |
| 3 | 8 | |

FIG. 3B
NODE DATA

| NUMBER OF NODES | 3602 | | |
|---|---|---|---|
| NODE NUMBER | X-COORDINATE VALUE | Y-COORDINATE VALUE | Z-COORDINATE VALUE |
| 1 | 0.0 | 0.0 | 0.0 |
| 2 | 5.0 | 0.0 | 0.0 |
| 3 | 0.0 | | |

MODEL SIMPLIFICATION APPARATUS AND PROGRAM

CLAIM OF PRIORITY

The present application claims priority from Japanese application serial no. 2006-216366, filed on Aug. 9, 2006, the contents of which are hereby incorporated by references into this application.

FIELD OF THE INVENTION

The present invention relates to an apparatus for supporting a CAE (Computer Aided Engineering), which provides rationalization and high efficiency of development and design work by means of a three-dimensional CAD (Computer Aided Design) and numerical simulation as well as a CAE (Computer Aided Manufacturing), which provides rationalization and high efficiency of manufacturing work. In particular, the invention is suitable for apparatus that simplifies and forms a mesh for numerical analysis on a geometric model input to a computer.

BACKGROUND OF THE INVENTION

Efforts for improving the efficiency of design and manufacturing by utilizing 3D (three-dimensional) model data formed during a design process in CAE and CAM are widely practiced. However, 3D data may include small geometrical shapes of parts such as very small holes and grooves. In such cases, for example, a mesh that is used in CAE becomes very fine and the time of computation for analysis will increase.

For this reason, simplification to remove the shapes of some parts considered as having no effect on a solution of analysis calculation from a model is performed widely. Especially, in CAM, it is required to form an intermediate shape before machining from a final product shape as input data to machining equipment. The intermediate shape is formed by removing the shapes of some parts such as screw holes from the final product shape. In CAM, it is desirable that specified shapes and similar partial shapes can be removed collectively, because shapes that can be machined by each individual machining equipment are generally fixed.

As for geometry simplification, apparatus, and a similar shape search method, it is known that a shape is selected for simplification, based on parameters representing the dimensions of feature shapes, which is described, for example, in Japanese laid-open Patent publication No. 2000-331194. Also, in Japanese laid-open Patent publication No. 2001-117907, it is described that, for a polyhedral geometric model (polygon model), a polyhedral model is numerically represented from an axial moment function of a polyhedron and a similar model is searched out.

The above-mentioned techniques of prior art enable simplification of basic feature shapes such as holes and fillets in a batch fashion, based on their parameters. However, feature shapes that can be simplified are limited to those registered beforehand. Complex and large shapes are hard to simplify in view of efficiency, computation time, etc. The method of searching for a polyhedral shape similar to an arbitrary polyhedral shape is not capable of searching for a partial feature shape existing in a polyhedral shape and cannot accommodate needs sufficiently.

An object of the present invention is to allow for efficient selection of partial shapes similar to any specified portion in a model with regard to 3D geometric model data, thereby making it possible to efficiently perform geometry simplification even for complex and large shapes.

SUMMARY OF THE INVENTION

The present invention is configured as follows, to solve the above problem.

A model simplification apparatus that, after input of a 3D geometric model to be subjected to numerical analysis to a computer, forms a surface mesh for numerical analysis on the geometric model while simplifying it, the model simplification apparatus comprising:
  a mesh formation section for forming a surface mesh by using a plurality of mesh elements on the input geometric model and registering the surface mesh as an initial mesh into a database;
  a geometry feature definition section for classifying the surface mesh into partial surface meshes having geometry features based on angles formed between respective adjacent mesh elements, and calculating feature quantities of the partial surface meshes classified;
  a feature shape input section capable of sequentially inputting each group of mesh elements of the geometry features as reference feature shapes;
  a similar feature shape search section for searching for groups of mesh elements of similar geometry features to said reference feature shapes, wherein the similar geometry features are comprised of groups of geometry features whose adjacency is equal to an adjacency of the reference feature shapes and in which the summation of differences of feature quantities between the similar feature shapes and the reference feature shapes is not greater than a threshold value; and
  a mesh simplification section for removing groups of mesh elements corresponding to the similar feature shapes from the initial mesh, and forming simplified mesh parts newly instead of removed similar feature shapes in spaces made by the removal.

Another aspect of the present invention is as follows.

A computer program product for use in a model simplification apparatus that, after input of a 3D geometric model to be subjected to numerical analysis to a computer, forms a surface mesh for numerical analysis on the geometric model while simplifying it, the computer program comprising:
  a function for forming a surface mesh by using a plurality of mesh elements on the input geometric model and registering the surface mesh as an initial mesh into a database;
  a function for classifying the surface mesh into partial surface meshes having geometry features based on angles formed between respective adjacent mesh elements, and calculating feature quantities of the partial surface meshes classified;
  a function capable of sequentially inputting each group of mesh elements of the geometry features as reference feature shapes;
  a function for searching for groups of mesh elements of similar geometry features to the reference feature shapes, wherein the similar geometry features are comprised of groups of geometry features whose adjacency is equal to an adjacency of the reference feature shapes and in which the summation of differences of feature quantities between the similar feature shapes and the reference feature shapes is not greater than a threshold value; and
  a function for removing groups of mesh elements corresponding to the similar feature shapes from the initial mesh, and forming simplified mesh parts newly instead of removed similar feature shapes in spaces made by the removal.

According to the present invention, a search is performed for similar feature shapes based on feature vectors of classified geometry features. Therefore, it is possible to make an efficient selection of partial shapes similar to a portion specified for simplification from a geometric model and to efficiently perform mesh geometry simplification even for complex and large shapes.

DETAILED DESCRIPTION OF EMBODIMENTS

Figure 1:
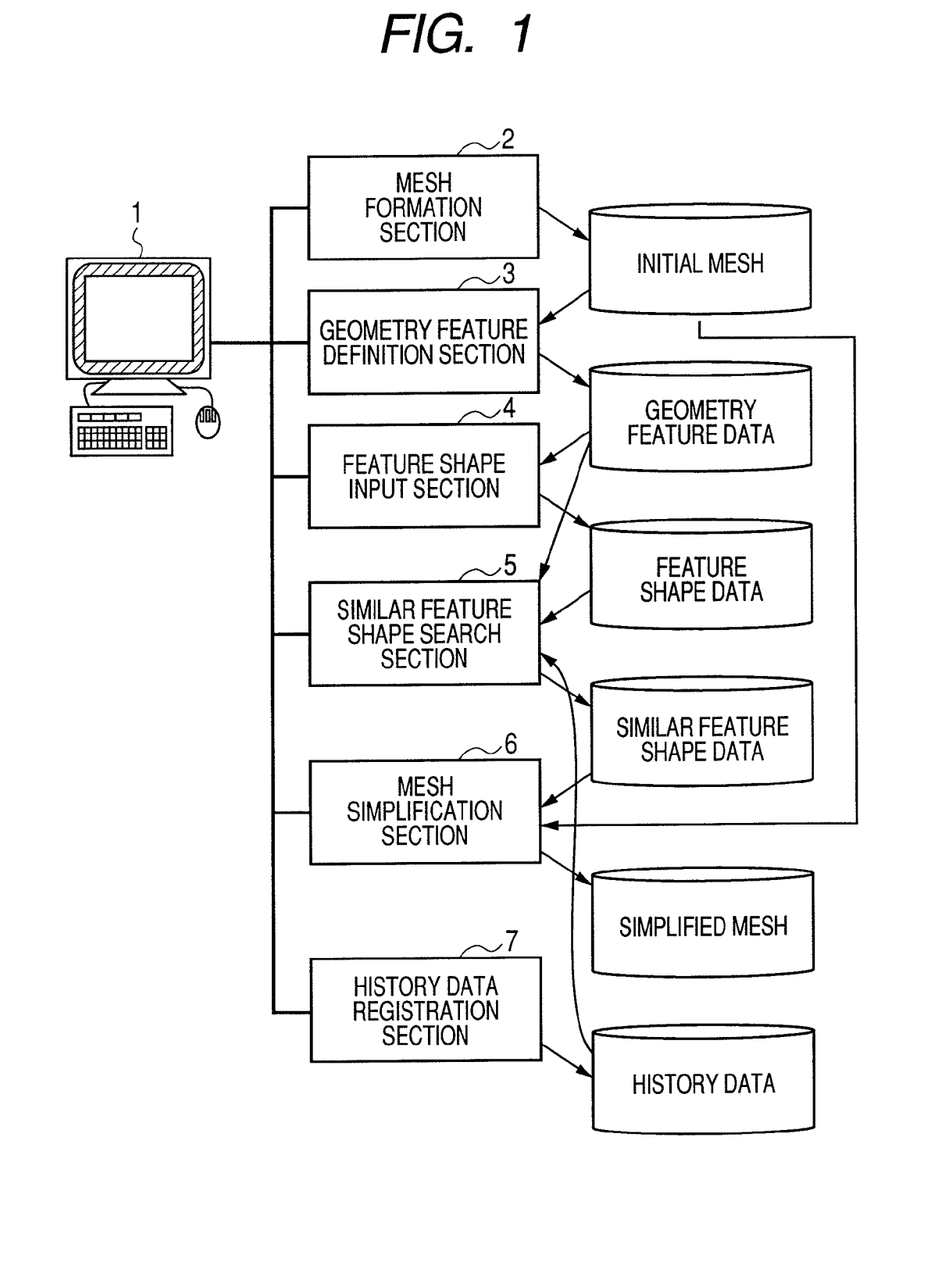
FIG. 1 is a block diagram of a model simplification apparatus which is one embodiment according to the present invention.

An embodiment of a configuration of a model simplification apparatus is shown in FIG. 1.

This apparatus includes:
an input/output device 1 with a keyboard, a mouse, a display, etc. for inputting and displaying data;
a mesh formation section 2 for taking in a geometric model to be analyzed, automatically forming a surface mesh on the geometric model or reading an exiting surface mesh on the geometric model, and registering the surface mesh as an initial mesh into a database; and
a geometry feature definition section 3 for reading out the initial mesh from the database, forming geometry feature data based on angles between respective adjacent mesh elements of the initial mesh, calculating a feature quantity representing the geometric feature, and registering the feature quantity into a database.

The apparatus further includes:
a feature shape input section 4 for prompting a system user to select groups of mesh elements of any geometry features referred to as feature shapes (reference feature shapes) in the initial mesh read out from the database, and registering the groups as feature shape data into a database; and
a similar feature shape search section 5 for searching for groups of mesh elements of geometry features (referred to as similar feature shapes) similar to the selected feature shapes in the initial mesh and registering the groups as similar feature data into a database. Here, the similar feature shapes are comprised of groups of mesh elements having geometry features whose adjacency is equal to an adjacency of the above-mentioned feature shapes selected by the system user and in which the summation of differences of feature quantities between the similar feature shapes and the feature shapes selected by the system user is not greater than a threshold value.

The apparatus further includes:
a mesh simplification section 6 for removing groups of mesh elements corresponding to the similar feature shapes from the registered initial mesh, forming simplified mesh parts newly instead of removed similar feature shapes in spaces made by the removal, and registering the simplified mesh parts into a database; and
a history data registration section 7 for registering association of the feature shape selected by the system user and a procedural step thereof as history information into a database.

Figure 2A:
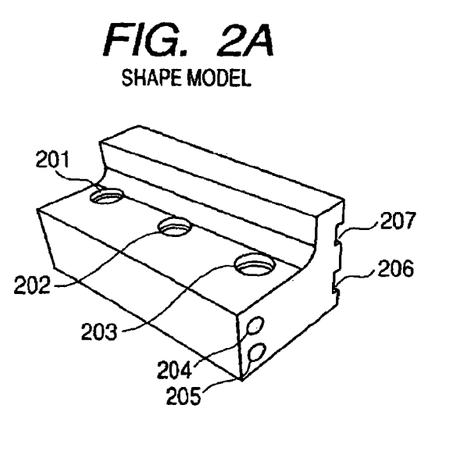
FIGS. 2A and 2B show perspective views of a geometric model and its surface mesh according to an embodiment.

Details of simplification of a 3D geometric model which is illustrated in FIG. 2A are explained. Holes 201 to 203 with counter bores, holes 204 and 205, grooves 206 and 207 are worked in the geometric model shown in FIG. 2A.

(1) Mesh Formation Section

Figure 2B:
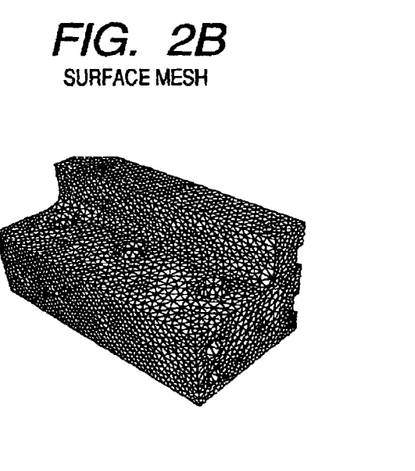
Figure 3A:
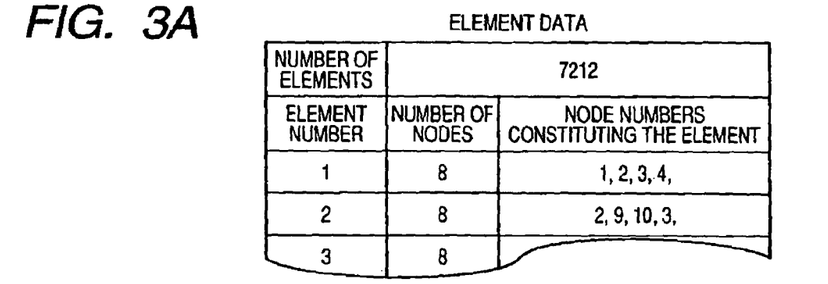
FIGS. 3A and 3B exemplify mesh data according to an embodiment.
Figure 3B:
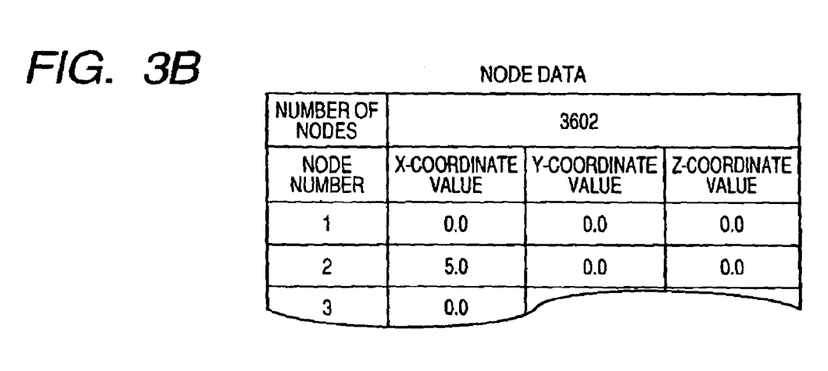

The tetrahedral mesh formation section 2 forms a surface mesh as illustrated in FIG. 2B on a geometric model (FIG. 2A) having been input via the input/output device 1 and registers it as an initial mesh into the database. A Delaunay method, an advancing front method, etc. are available as methods of forming such a surface mesh. Mesh data is comprised of element data and node data, as shown in FIGS. 3A and 3B. The element data includes the number of elements and node numbers constituting each element (namely mesh element) which are registered as the element data. The node data includes the number of nodes and the coordinate (X-coordinate, Y-coordinate, Z-coordinate) of each node which are registered as the node data.

(2) Geometry Feature Definition Section

The geometry feature definition section 3 classifies a surface mesh into partial surface meshes, which are referred to as geometry features, based on angles formed between respective adjacent mesh elements respectively, and calculates feature quantities representing the geometry features.

Classification into the partial surface meshes as the geometry features is explained as follows.

That is, obtaining a normal vector of each mesh element in the surface mesh; then, calculating each angle formed between normal vectors of adjacent mesh elements, and defining (classifying) each group of the mesh elements in which each angle formed between normal vectors of adjacent mesh elements is within a threshold value (angle threshold value), as a geometry feature of the partial surface mesh.

Figure 4:
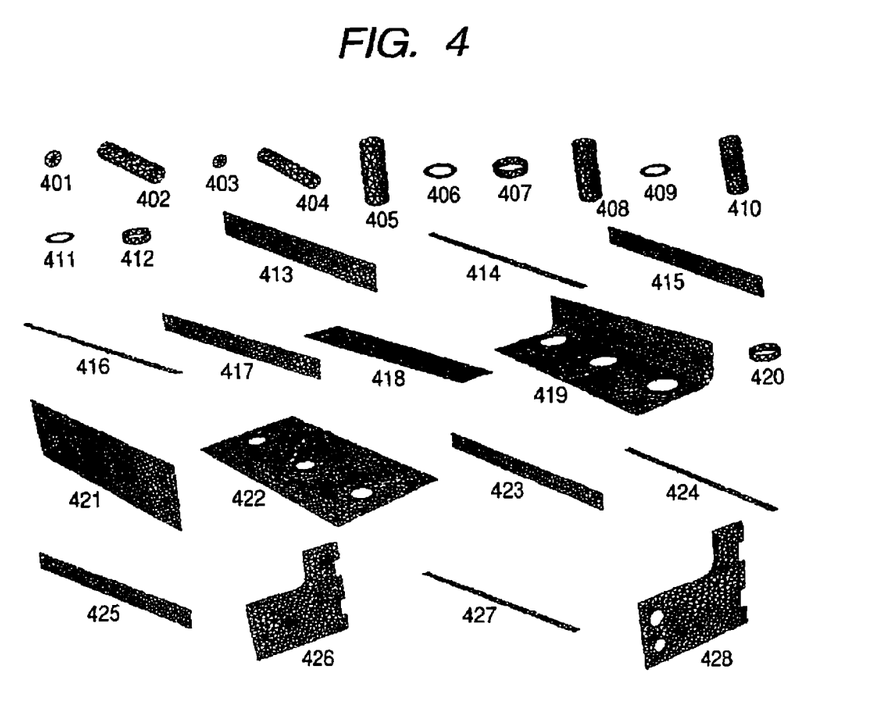
FIG. 4 shows perspective views of geometry features according to an embodiment.

FIG. 4 illustrates classification of the surface mesh of FIG. 2B into geometry features of the partial surfaces respectively by using an angle threshold value of 45 degrees. Here, the surface mesh is classified into a total of 28 geometry features 401 to 428. Incidentally, the angle threshold value can be changed by the system user.

The feature quantity of each geometry feature of the partial surface meshes is calculated as follows.

At the time of calculating the feature quantity, first, the following histogram is formed for all pairs of mesh elements as adjacent mesh elements belonging to each geometry feature (each partial surface mesh). In each geometry feature, when representing a centroidal distance between each two mesh elements (namely each pair of mesh elements as adjacent mesh elements) by a first axis, and representing an angle formed between the normal vectors of each two mesh elements by a second axis, areas of all pairs of mesh elements are accumulated with a histogram at positions (coordinates) corresponding on the first and second axes. The first axis is normalized such that a maximum $l_{max}$ of the centroidal distance is 1 and a minimum $l_{min}$ is 0, the region of the first axis is defined by a range from 0 to 1. This region is discretized to a finite number of sections N, wherein each section is represented by $L_i$ (i=1, 2, ..., N). As the second axis represents the angle formed between the normal vectors of each of all two mesh elements, its range is represented by range from 0 to 180 degrees. This is discretized by a finite number of sections M, wherein each section is represented by $\theta_j$ (j=1, 2, ..., M). That is, each of all two mesh elements is represented definitely belongs to any coordinate of ($L_i$, $\theta_j$). A value of histogram of ($L_i$, $\theta_j$) is denoted by Z ($L_i$, $\theta_j$).

Then, a sum (Val) of histogram values is obtained, the accumulation (Dum) of the areas at each position (coordinate) on the first and second axes is divided by this sum (Val), thereby the histogram is normalized such that the summation of histogram becomes "1". This is expressed as:

$$Val = \sum_{i=1}^{N} \sum_{j=1}^{M} Z(L_i, \theta_j)$$ [Mathematical expression 1]

$$Dum = Z(L_i, \theta_j)$$

$$Z(L_i, \theta_j) = Dum / Val$$

Figure 5:
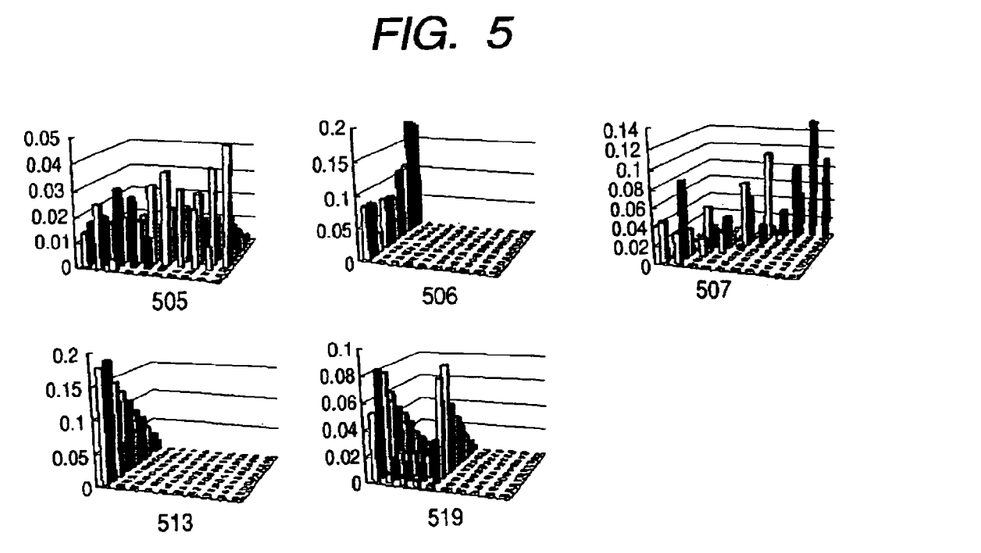
FIG. 5 shows the histograms of geometry features according to an embodiment.

The form of the histogram represents the geometry feature as each partial surface mesh, and it becomes a value not depending on its position and rotation. Here, by way of example, for the geometry features (partial surface meshes) 405, 406, 407, 413, and 419 shown in FIG. 4, their respective histograms 505, 506, 507, 513, and 519 are shown in FIG. 5. In the histograms, inter-centroid distance of each two meshes is represented on the axis (the first axis) in a depth direction, and the angle formed between the normal vectors of each two meshes is represented on the axis (the second axis) in a lateral direction.

(3) Feature Shape Input Section

The feature shape input section 4 prompts the system user to select any groups of mesh elements as geometry features, each of which is referred to as the feature shape, and registers them as feature shape data into the database.

Figure 6:
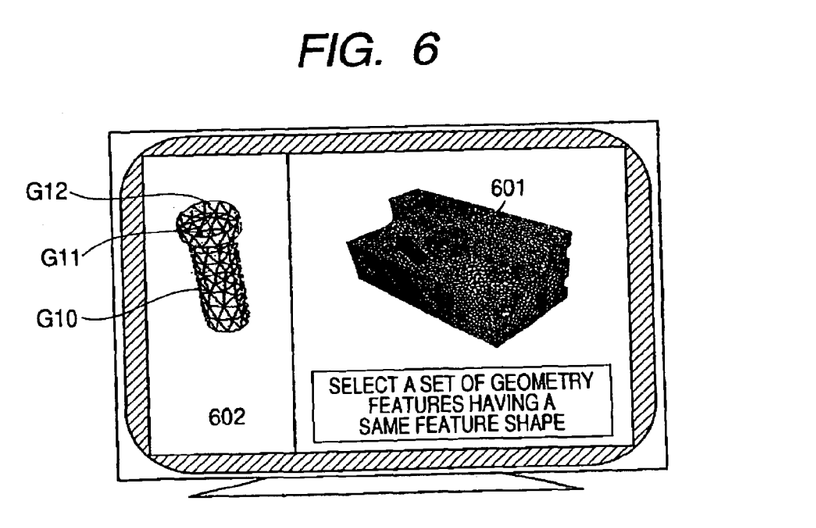
FIG. 6 shows a screen provided by a feature shape input unit according to an embodiment.

A screen image provided by the feature shape input section is shown in FIG. 6. Using a mouse pointer 601, the user is allowed to select any groups of mesh elements as geometry features. The selected groups of mesh elements of the geometry features are displayed in the same screen like an example image denoted by a reference number 602. In this example, a set of three geometric shapes G10, G11, and G12, which constitute a hole with counter bore denoted by a reference number 201 in FIGS. 2A and 2B, are selected (in the example image 602 of FIG. 6, "G" of a character is added to each head of reference numbers of the geometry features). After the selection, the feature shape input section 4 registers the selected groups of mesh elements corresponding to geometry features as feature shape data into the database assigning the reference numbers (G10, G11, G12) to the selected groups of mesh elements as geometry features.

(4) Similar Feature Shape Search Section

The similar feature shape search section 5 searches for groups of geometry features similar to the feature shapes selected by the system user in the initial mesh and registers the groups as similar feature data into a database. The similar feature shapes are comprised of groups of mesh elements having geometry features whose adjacency is equal to an adjacency of the above-mentioned feature shapes selected by the system user and in which the summation of differences of feature quantities between the similar feature shapes and the feature shapes selected by the system user is not greater than a threshold value.

For example, in the feature shape of the example image 602 of FIG. 6, selected geometric features G10 and G11, G11 and G12 are adjacent respectively, but G10 and G12 are not adjacent. Three geometry features whose adjacency is equal to this adjacency are all searched for in the initial mesh. Searching for groups of geometry features having such an adjacency can be performed easily, because the adjacency among the geometry features is self-evident.

With regard groups of the geometry features searched for from view of the adjacency, difference of the feature quantities between each of the searched geometry features and each of the selected feature shapes is calculated and the summation thereof is calculated. When assuming a histogram representing the feature quantity of a reference geometry feature A (namely selected feature shape) as $Z_A$ ($L_i$, $\theta_j$) and a histogram representing the feature quantity of a geometry feature B (namely searched geometry feature as a similar feature) as $Z_B$ ($L_i$, $\theta_j$), a difference $V_{AB}$ between these feature quantities is expressed as:

$$V_{AB} = \sum_{i=1}^{N} \sum_{j=1}^{M} |Z_A(L_i, \theta_j) - Z_B(L_i, \theta_j)| \times 0.5$$ [Mathematical expression 2]

Here, $V_{AB}$ is represented by a real number within a range of from 0 to 1 and this number nearer to 0 indicates closer similarity in shape between the geometry features A and B.

In this way, groups of geometry features similar to feature shapes selected by the system user can be searched for.

Figure 7:
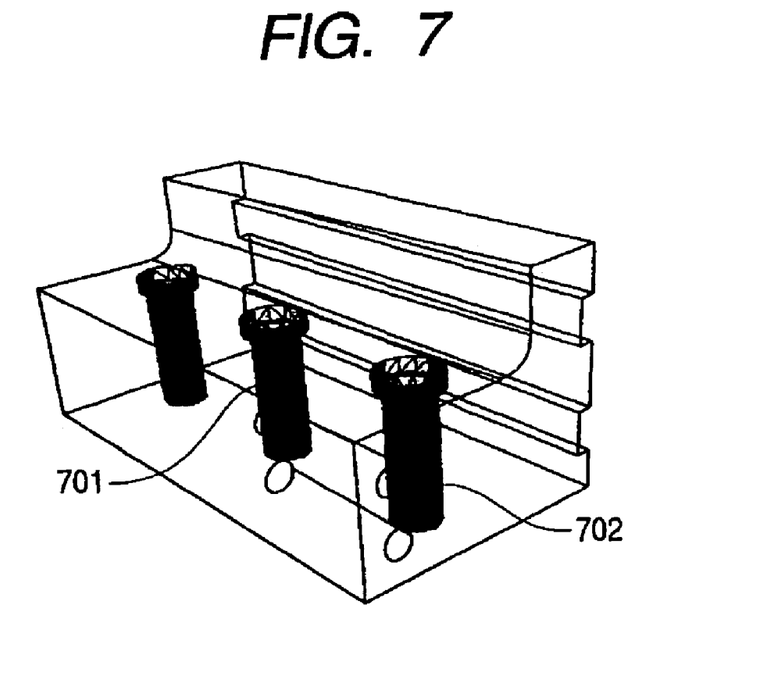
FIG. 7 shows a perspective view of a similar feature shape according to an embodiment.

FIG. 7 shows similar feature shapes (groups of geometry features) 701 and 702 searched for with regard to the example image 602, wherein the difference of a feature quantity between each similar feature shape (each searched geometry feature) and each selected feature shape (each reference geometry feature) is assumed to be 0.05.

(5) Mesh Simplification Section

The mesh simplification unit 6 removes groups of partial surface meshes (mesh elements) having the searched similar feature shapes and forms simplified mesh parts newly instead of the removed partial surface meshes (searched similar feature shapes) in spaces formed by the removal.

Figure 8:
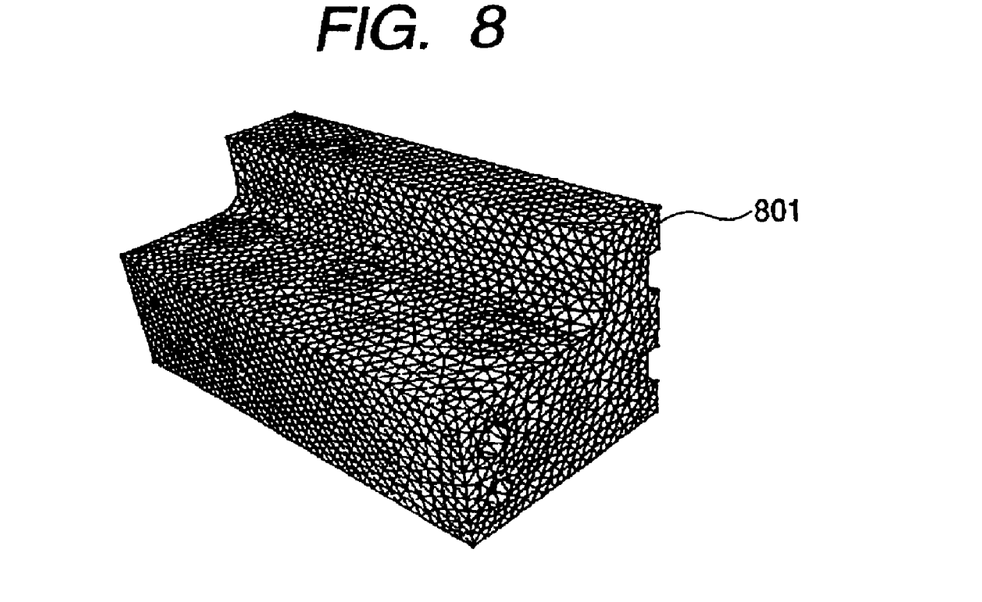
FIG. 8 shows a simplified mesh according to an embodiment.

The boundary of the space where each group of partial surface meshes was removed has one surface mesh part belonging to a mesh side. Therefore, the boundary of the space is searched for and a surface mesh part is formed again by using their nodes. Available methods of forming again the mesh part in such a space are Delaunay method, advancing front method, etc. In FIG. 8, a finally entire surface mesh 801 with mesh parts (for example, corresponding to holes with counter bores) simplified by the mesh simplification unit 6 is shown.

Finally, the mesh simplification unit 6 registers simplified mesh parts into the database. By the manner described hereinbefore, it is possible to efficiently search for a shape similar to an arbitrary complex shape such as a hole with counter bore and perform its simplification.

(6) History Data Registration Unit

The history data registration section 7 registers an association of a feature shape selected by the system user with a procedural step as history information into the database.

Figure 9:
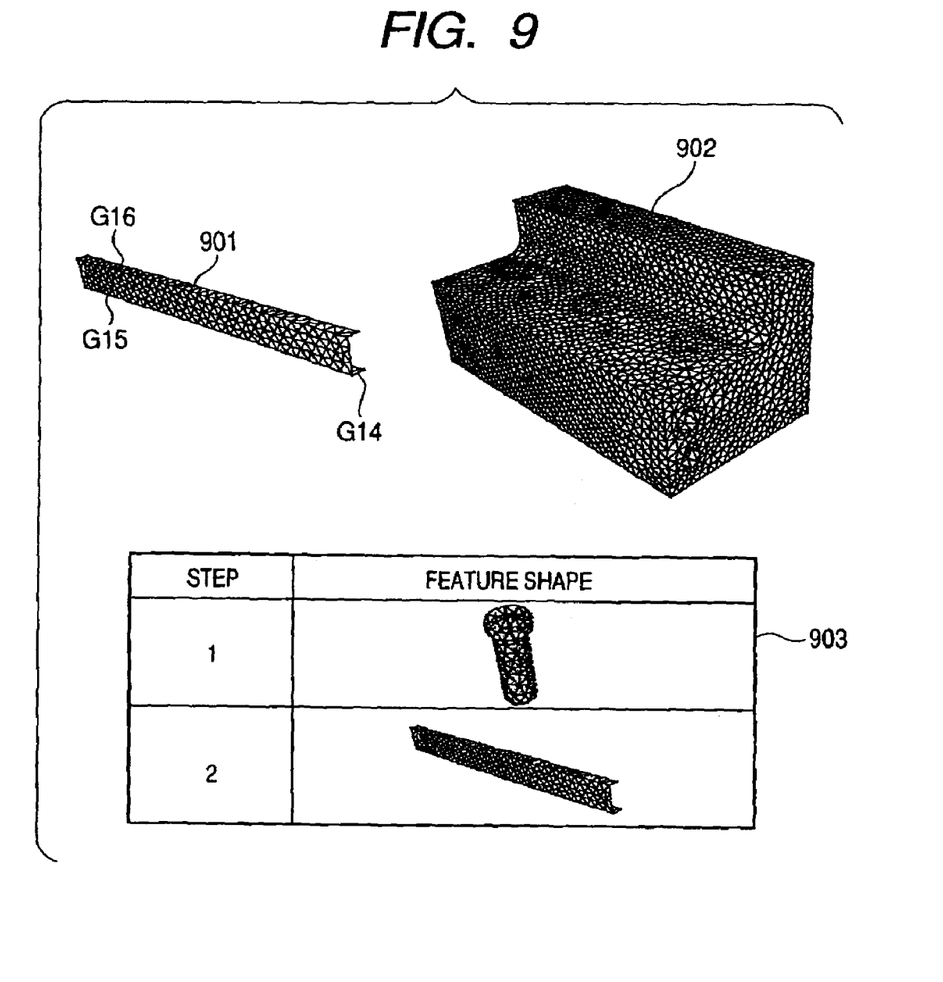
FIG. 9 shows a simplified mesh in which a groove shape was removed according to an embodiment.

Assume that, for example, a groove shape denoted by 901 of FIG. 9 is selected as feature shapes (partial surface meshes G14, G15, G16) from the surface mesh denoted by 801, groups of geometric features similar to the selected feature shapes are searched for, simplification is performed to the searched geometric features, and a surface mesh denoted by 902 is formed finally. In this case, the history data registration section 7 associates groups (for example G14, G15, G16) of geometry features belonging to feature shapes used for search with groups of surface mesh elements constituting the respective feature shapes and registers this association during simplification in accordance with a simplification procedure, as exemplified by a table denoted by 903.

By this registration, for example, when another model is simplified, registered feature shapes can be used as a search key. The present simplification procedure is to form a model in an intermediate machined state based on a final product shape; i.e., the simplification procedure reverses a machining procedure. Therefore, actually, first, holes 204 and 205 are machined in a base part; then, grooves 206, 207 are cut; and finally, holes 201, 202, 203 with counter bores are machined.

Figure 10:
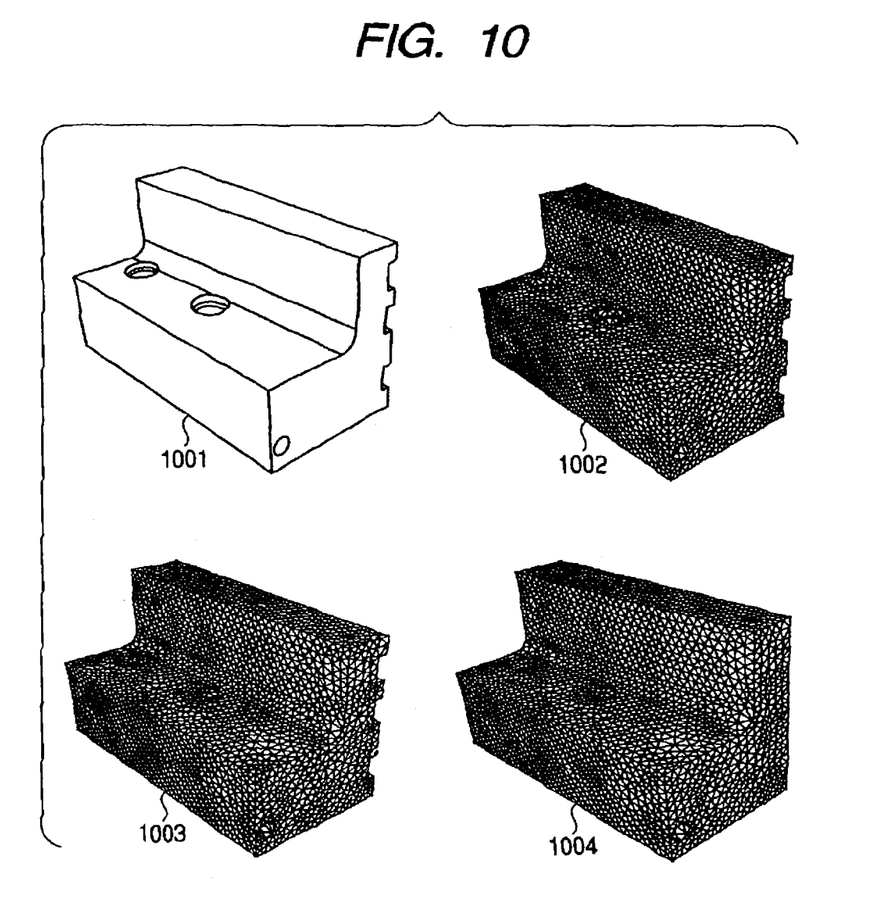
FIG. 10 shows perspective views of an object to explain simplification according to an embodiment.

Here, reusing history data is explained. Simplification of a model denoted by 1001 (j surface mesh data is denoted by 1002) in FIG. 10 is performed as follows. When the machining process of this model is the same as for the model denoted by 202 in FIGS. 2A and 2B, the simplification can be performed more efficiently by reusing the history data 903 on previously performed simplification.

The history data registration section 7 prompts the system user to select a simplification history to be reused from the history data registered in the database. Then, this section displays selected history data in a list in which a procedural steps are associated with feature shapes for which simplification was executed in the steps, for example, as exemplified in FIG. 11.

The history data registration unit 7 prompts the system user to select a simplification process. Simplification is executed for all feature shapes registered associated with a selected procedure (process) which was performed previously. The simplification method is as already described.

Figure 11:
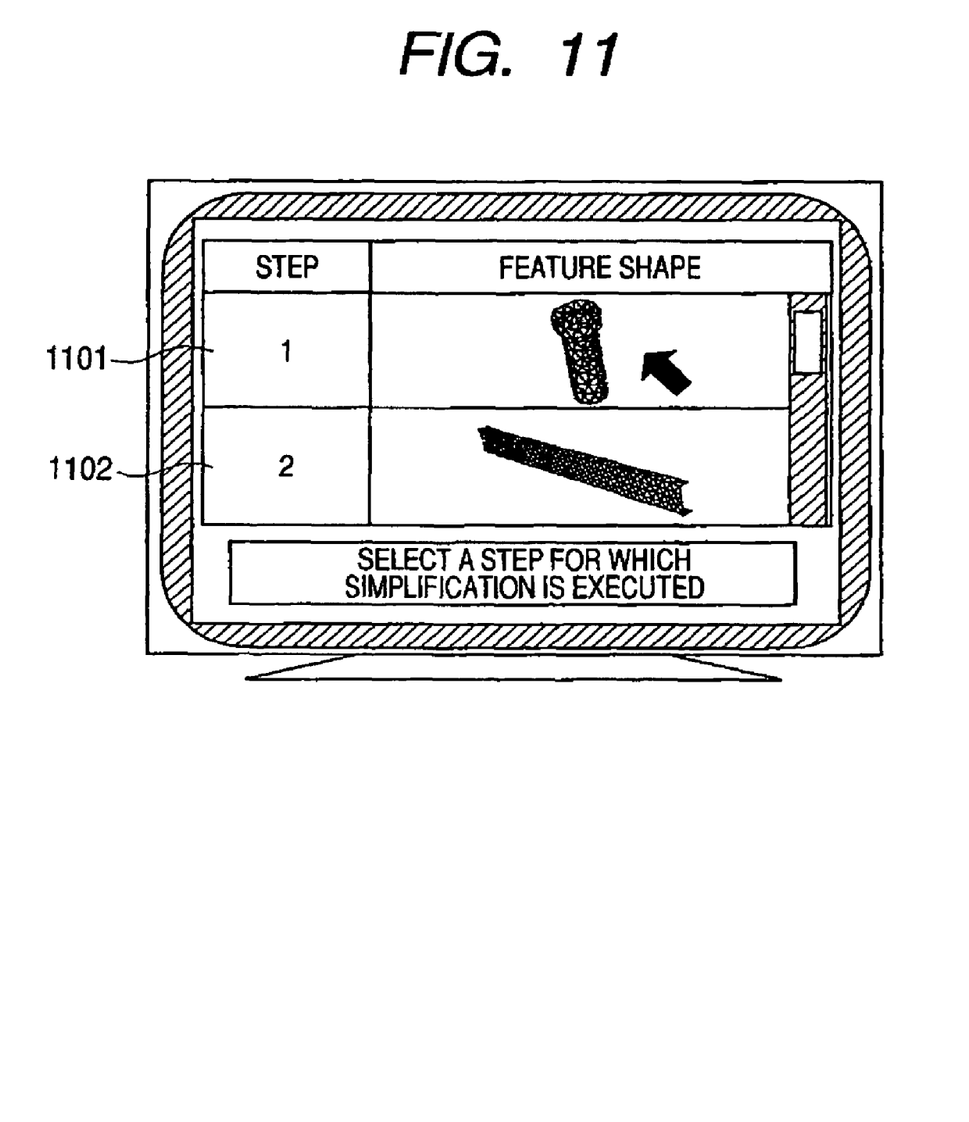
FIG. 11 shows a screen provided by a history data registration unit according to an embodiment.

In FIG. 10, 1003 denotes a simplified model when the system user selects a step 1101 of FIG. 11 as a process, and the process is that only the holes with counter bores are simplified from the object 1002. Also, 1004 denotes a simplified model when the system user selects steps 1001 and 1002 of FIG. 11 as a process, and the holes with counter bores and grooves are simplified from the object 1002.

According to the model simplification apparatus described hereinbefore, it is possible to, after any partial shape is selected, search for a partial shape similar to this shape and perform simplification in a batch fashion. Consequently, improving the efficiency of the work can be achieved. Furthermore, by reusing simplification history, it is possible to easily obtain an intermediate machined shape of a part which is machined by a similar machining procedural step.

What is claimed is:

1. A model simplification apparatus that, after input of a 3D geometric model to be subjected to numerical analysis, forms a surface mesh for numerical analysis on the geometric model while simplifying it, the model simplification apparatus comprising:
    a mesh formation section for forming a surface mesh by using a plurality of mesh elements on said input geometric model and registering said surface mesh as an initial mesh into a database;
    a geometry feature definition section for classifying said surface mesh into partial surface meshes having geometry features based on angles formed between respective adjacent mesh elements, and calculating feature quantities of said partial surface meshes classified;
    a feature shape input section capable of sequentially inputting each group of mesh elements of said geometry features as reference feature shapes;
    a similar feature shape search section for searching for groups of mesh elements of similar geometry features to said reference feature shapes, wherein the similar geometry features are comprised of groups of geometry features whose adjacency is equal to an adjacency of said reference feature shapes and in which the summation of differences of feature quantities between said similar feature shapes and said reference feature shapes is not greater than a threshold value;
    a mesh simplification section for removing groups of mesh elements corresponding to said similar feature shapes from said initial mesh, and forming newly simplified mesh parts instead of removed similar feature shapes in spaces made by the removal; and
    wherein each of said feature quantities of said partial surface is obtained based on a histogram representing an accumulation of the areas of all pair of mesh elements in each of said partial surface meshes as each geometry feature, with regard to centroidal distances between the respective pair of mesh elements and normal vectors of respective pair of said mesh elements; and
    wherein at least one of the mesh formation section, the geometry feature definition section, the feature shape input section, the similar feature shape search section and the mesh simplification section, is implemented via a computer.

2. The model simplification apparatus according to claim 1, wherein sequential input of said each feature shape is registered as history information into a database.

3. The model simplification apparatus according to claim 1, wherein sequential input of said each feature shape is registered as history information into a database; and said each feature shape based on said history information can be selected by said feature shape input section.

* * * * *